United States Patent
Spruegel et al.

(10) Patent No.: US 8,591,666 B2
(45) Date of Patent: Nov. 26, 2013

(54) METHOD AND APPARATUS FOR CLEANING PARTICLE FILTERS IN EXHAUST GAS SYSTEMS OF COMBUSTION ENGINES

(75) Inventors: Friedrich Spruegel, Munich (DE); Alfons Urban, Bad Heilbrunn (DE)

(73) Assignee: TUNAP Industrie Chemie GmbH & Co. Produktions KG, Wolfratshausen (DE)

( * ) Notice: Subject to any disclaimer, the term of this patent is extended or adjusted under 35 U.S.C. 154(b) by 287 days.

(21) Appl. No.: 12/819,588

(22) Filed: Jun. 21, 2010

(65) Prior Publication Data
US 2010/0319731 A1 Dec. 23, 2010

(30) Foreign Application Priority Data
Jun. 19, 2009 (DE) .................. 10 2009 025 598

(51) Int. Cl.
*B08B 7/00* (2006.01)
*F23J 1/00* (2006.01)

(52) U.S. Cl.
USPC .............................. 134/20; 422/178; 422/179

(58) Field of Classification Search
USPC ...................... 134/20; 422/178, 179
See application file for complete search history.

(56) References Cited

U.S. PATENT DOCUMENTS

| | | | |
|---|---|---|---|
| 6,632,406 B1 * | 10/2003 | Michelin et al. | 422/178 |
| 7,326,265 B2 * | 2/2008 | Zilliox et al. | 55/302 |
| 2003/0159436 A1 | 8/2003 | Foster | |

FOREIGN PATENT DOCUMENTS

| | | |
|---|---|---|
| DE | 4313132 A1 | 10/1994 |
| DE | 10118864 A1 | 10/2002 |
| DE | 102005040888 A1 | 4/2006 |
| EP | 0623372 A | 11/1994 |
| EP | 1181966 A | 2/2002 |
| EP | 1181966 A1 * | 2/2002 |
| JP | 57163113 A | 10/1982 |
| JP | 2004239072 A * | 8/2004 |
| JP | 2004239072 A | 8/2004 |
| WO | WO-2004/101112 A | 11/2004 |
| WO | WO 2004101112 A1 * | 11/2004 |

* cited by examiner

*Primary Examiner* — Michael Kornakov
*Assistant Examiner* — Katelyn Whatley
(74) *Attorney, Agent, or Firm* — Muncy, Geissler, Olds & Lowe, PLLC

(57) ABSTRACT

A method for cleaning particle filters in exhaust gas systems of combustion engines, in particular diesel engines in vehicles. In order to clean a particle filter, a noncombustible, ash-free cleaning fluid is sprayed into the particle filter at high pressure by a spray nozzle, across an area of said filter through which the exhaust gas flows during the operation of the combustion engine, in a quantity such that the interior of the particle filter is substantially completely soaked. Also provided is an apparatus for carrying out the method, which includes a container containing, under pressure, the fluid to be injected into the particle filter to be cleaned, an outlet valve, and a spray nozzle, which can be connected to the outlet valve via a hose and can be inserted into a space in the exhaust gas system situated before or after the particle filter.

13 Claims, 2 Drawing Sheets

METHOD AND APPARATUS FOR CLEANING PARTICLE FILTERS IN EXHAUST GAS SYSTEMS OF COMBUSTION ENGINES

BACKGROUND OF THE INVENTION

The invention relates to a method for cleaning particle filters in exhaust gas systems of combustion engines, in particular diesel engines in vehicles.

Given the increasing requirements on environmental and climatic compatibility, an increasing number of vehicles, especially those operated with diesel engines, are nowadays being fitted with particle filters, these generally being arranged in the exhaust gas system after the catalytic converter in order to filter incompletely burnt fuel in the form of soot and soot agglomerates out of the exhaust gas. By its very nature, a particle filter of this kind becomes clogged in the course of its operation since it is blocked to an increasing extent by the soot particles retained. It is therefore necessary to regenerate the particle filter from time to time.

In general, the particle filter on vehicles is regenerated by operating the engine at increased load, leading to an increase in the exhaust gas temperature in the particle filter. The effect of this increase in the exhaust gas temperature is that the soot particles retained are subsequently burnt in the soot particle filter, thereby freeing the particle filter again. In the case of vehicle engines, passive regeneration of this kind is carried out at high speed during freeway journeys, for example.

However, if a vehicle is mainly used only in an urban environment or for short distances on country roads, with the result that passive regeneration of the particle filter does not take place for a prolonged period, active regeneration has to be carried out, and this takes place when an appropriate sensor system, e.g. in the pressure sensor before and after the particle filter, detects that the throughput through the filter is becoming too low, i.e. that the filter must be regenerated.

Thus if the engine control system ascertains that active regeneration should be carried out, the engine injection point is retarded for this purpose, for example, and this also leads to an increased exhaust gas temperature in the particle filter since in this case the fuel is also burned in the exhaust gas system. This increase in the exhaust gas temperature also leads to burning of the retained soot particles, i.e. of the incompletely burnt fuel in the particle filter.

If regeneration still does not take place, owing to driving conditions for example, the driver is requested to visit a service garage. The service garage can intervene manually by electronic means to make the engine control unit carry out a regeneration.

However, this method is possible only up to a certain loading condition. If this "manual" regeneration is no longer possible, the usual practice nowadays in this case is to replace that part of the vehicle's exhaust gas system which contains not only the particle filter but also the catalytic converter. At best, the only choice remaining for the operator of the vehicle is between buying a brand new particle filter or a reconditioned particle filter together with the corresponding exhaust gas system subassembly, but in either case this leads to considerable costs for the vehicle operator.

SUMMARY OF THE INVENTION

Taking this situation as a starting point, it is the object of the invention to provide a method for cleaning particle filters in exhaust gas systems of combustion engines, in particular diesel engines, in vehicles which makes it possible to clean a particle filter in a simple and economical manner without the need to remove the particle filter, and which is suitable for use in service garages.

According to the invention, this object is achieved by the method as claimed in claim 1, which can be carried out with particular advantage using the apparatus as claimed in claim 11. Advantageous embodiments and developments of the invention are described in the corresponding subclaims.

According to the invention, therefore, particle filters in exhaust gas systems of combustion engines are cleaned by spraying a noncombustible, ash-free cleaning fluid into the particle filter at high pressure by means of a spray nozzle, across an area of said filter through which the exhaust gas flows during the operation of the combustion engine, in a quantity such that the interior of the particle filter is substantially completely soaked. In this way, it is possible in the particle filter to detach the particles retained therein, that is to say especially soot, from the walls of the particle filter, allowing them then to be removed from the particle filter together with the cleaning fluid.

Since the method according to the invention can be carried out, in particular, even when the particle filter is in the exhaust gas system of the motor vehicle, i.e. does not have to be removed, the method developed is one which results in cost savings, is appropriate for service garages and can be carried out without much effort.

It is expedient if the cleaning fluid is injected at a pressure of from 5 to 12 bar, in particular from 6 to 8 bar. This ensures that the cleaning fluid can be injected into particle filters in an effective manner, even when they are severely clogged, thus ensuring rapid cleaning.

In order to achieve complete soaking of the interior of the particle filter, it is expedient if the quantity of cleaning fluid to be injected corresponds approximately to half the volume of the particle filter (25).

In order to further enhance the effectiveness of particle filter cleaning, provision is advantageously made for the cleaning fluid to be injected successively in two, three or more portions, the time between the individual injection operations being from 1 to 10 minutes, preferably from 3 to 7 minutes, in particular 5 minutes. The time provided by the invention for the action of the cleaning fluid significantly improves the effectiveness of cleaning.

A further embodiment of the invention is distinguished by the fact that the cleaning fluid is injected into the particle filter when the latter is at a temperature of from 10° C. to 100° C., preferably of from 40° C. to 70° C. This makes it possible to achieve effective cleaning results, even when the time of action is relatively short.

In another advantageous development of the invention, provision is made for an ash-free, noncombustible flushing fluid to be sprayed into the particle filter after the injection of the cleaning fluid, the flushing fluid being injected at the same pressure as the cleaning fluid. Through the subsequent flushing of the particle filter with a flushing fluid which is injected at high pressure, the soot-laden cleaning fluid can be removed from the filter to a large extent in a service garage.

When a flushing operation is carried out, it is expedient if the flushing fluid is injected after a waiting time following the ending of injection of the cleaning fluid which is equal to or longer than the time between the individual injection operations for cleaning fluid in order to allow the cleaning fluid to achieve its full effect.

Suitable cleaning fluids include, in particular, aqueous alkaline fluids that are noncombustible and can be removed from the particle filter without leaving a residue or can be evaporated therefrom.

To enable the method according to the invention to be carried out in a particularly simple manner, an apparatus having a container containing, under pressure, the fluid to be injected into the particle filter to be cleaned, an outlet valve, and a spray nozzle, which can be connected to the outlet valve via a hose and can be inserted into a space in the exhaust gas system situated before or after the particle filter is provided. An apparatus of this kind allows easy access to the spaces before and after the particle filter in the installed condition thereof, for the purpose of cleaning the latter.

A particularly advantageous embodiment of the apparatus according to the invention is distinguished by the fact that the spray nozzle is designed as a tube which is closed at its free end and has a plurality of nozzle openings in the circumferential wall of the tube, the nozzle openings being aligned substantially in the longitudinal direction of the tube, with the result that the jets emerging from the nozzle openings are substantially parallel and/or are in one plane.

DESCRIPTION OF THE FIGURES

The invention will be explained in greater detail below with reference to the drawing. In the drawing.

Figure 1:
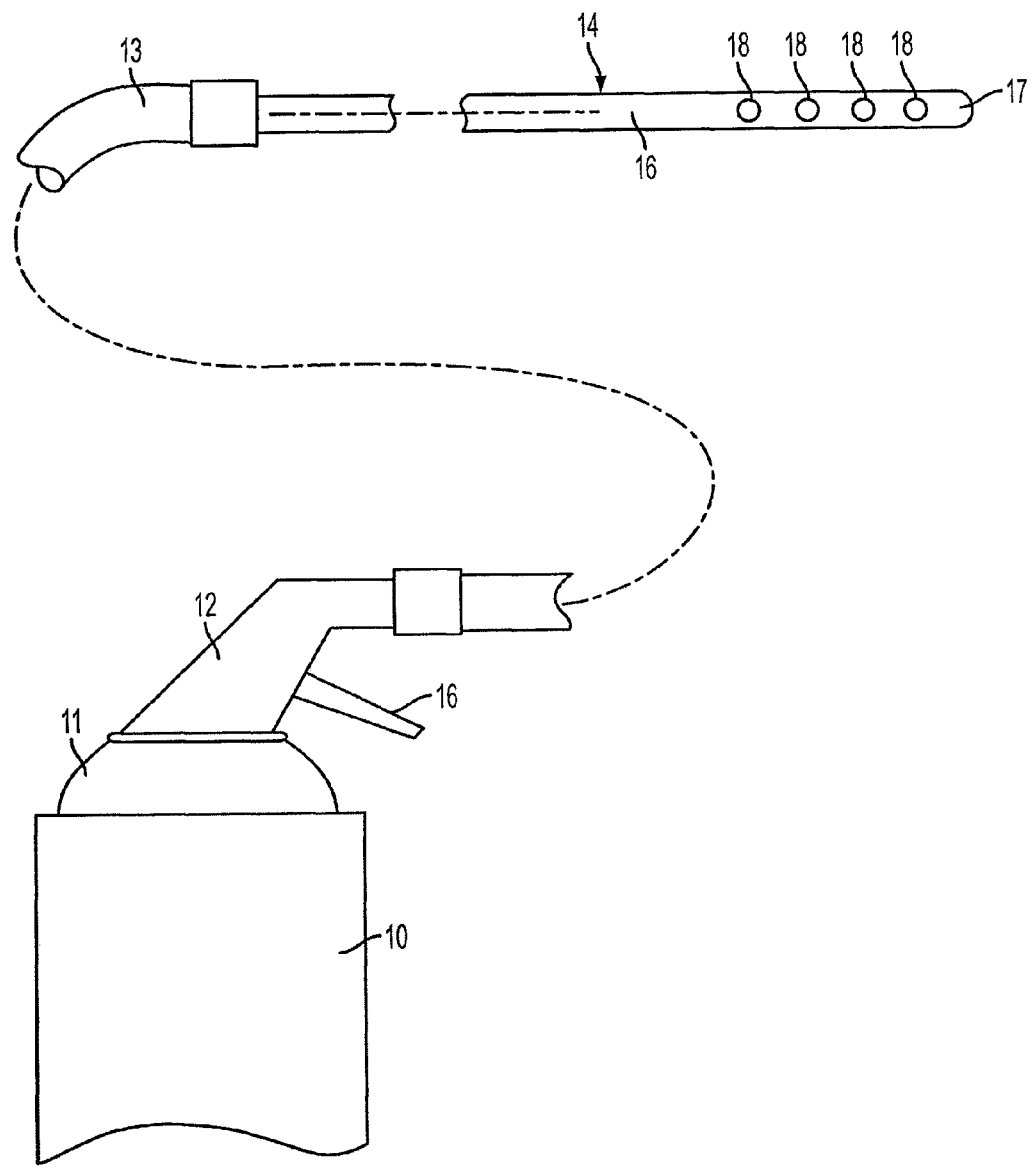
FIG. 1 shows a simplified schematic representation of an apparatus according to the invention for cleaning particle filters in exhaust gas systems.

In the various figures of the drawing, corresponding components are provided with the same reference signs.

DETAILED DESCRIPTION OF THE INVENTION

As illustrated in FIG. 1, the apparatus according to the invention for cleaning a particle filter situated in an exhaust gas system of a vehicle has a container 10, which holds the fluid to be injected into the particle filter to be cleaned. The container 10, which is designed as a pressure vessel, either has an integrated accumulator or can be connected to a compressed air system, in a manner not shown specifically, to enable the fluid to be delivered from the container 10 at high pressure. For the purpose of dispensing the cleaning fluid from the pressurized container 10, an outlet valve 11 is provided, the outlet side of which is connected via a connection piece 12 to one end of a hose, in particular a pressure hose 13, to the other end of which a spray nozzle 14, preferably in the form of a lance, is fitted. The outlet valve 11 can be opened by means of an actuating lever 15 provided in the connection piece 12 to allow cleaning fluid to be dispensed in a metered and targeted way.

The spray nozzle 14 expediently comprises a tube 16, which is closed in a pressure tight manner at its free end 17 and, adjacent to its free end 17, has a plurality of nozzle openings 18, which are aligned substantially along a surface line of the tube, parallel to the axis thereof, with the result that the fluid jets 19 (see FIG. 3) emerging from the individual nozzle openings 18 are substantially parallel to one another.

Although the spray nozzle in the form of a lance is depicted as a straight tube in the drawing, and it is possible to achieve good cleaning of particle filters in an extremely wide variety of installation situations with this nozzle, it is also conceivable to provide spray nozzles that are bent or offset for specific exhaust gas systems, although the free end of the nozzle tube 16, which bears the nozzle openings 18, preferably remains straight. However, it is also conceivable to make the nozzle tube 16 curved in the region of the outlet nozzles 18 so that the emerging jets are divergent or convergent with respect to one another or are still parallel but no longer in one plane. The curvature can also be such that the individual jets lie on the envelope of a cone that tapers or diverges.

Figure 2:
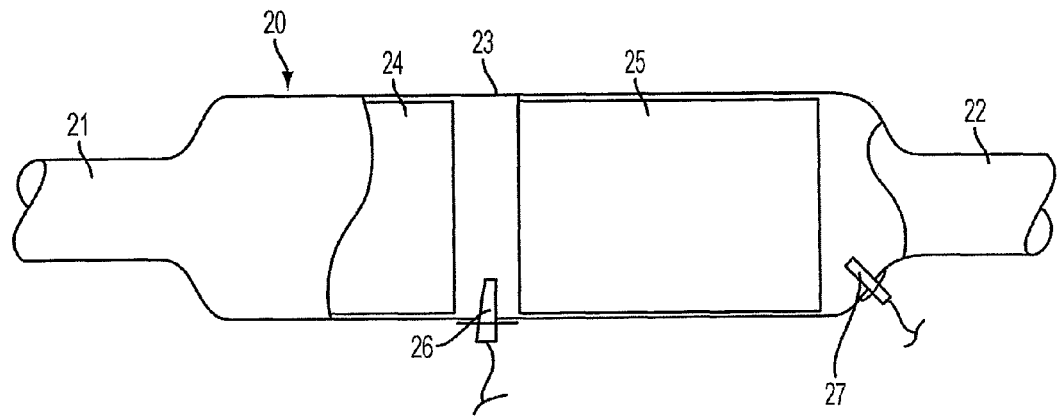
FIG. 2 shows a simplified schematic representation of that part of an exhaust gas system of a combustion engine which contains a particle filter.

As is illustrated schematically in FIG. 2, an exhaust or exhaust gas tube 20 comprises an exhaust or exhaust gas system of a combustion engine in a vehicle, an inlet portion 21 connected to an exhaust gas outlet of a combustion engine (not shown), an outlet portion 22 leading to the environment, and, in between, a cylindrical housing portion 23, which has a significantly larger cross section than the inlet and outlet portions 21 and 22. In conventional exhaust systems, a catalytic converter 24 for converting carbon monoxide and nitrogen oxides into carbon dioxide and nitrogen, and a particle filter 25, which, as already explained at the outset, filters incompletely burnt fuel constituents, i.e. soot, out of the exhaust gas to be emitted to the environment, are generally arranged on the inlet side in this housing portion 23.

In order to control the combustion engine, in particular diesel engine, of the motor vehicle in such a way that those constituents of the exhaust gas which have a harmful effect on the environment and the climate are minimized as far as possible, various sensors are mounted on the housing portion 23 and are passed through corresponding openings in the housing wall. For the sake of simplicity, only two pressure sensors 26, 27, are shown in FIG. 2, said sensors being arranged upstream and downstream respectively of the particle filter 25 so as to be able to determine the loading condition of the particle filter 25 on the basis of the pressure differences detected.

To clean a particle filter 25 situated in the exhaust gas system by means of the method according to the invention, an opening 30 leading into the interior of the housing 23 before the particle filter 25 to be cleaned is preferably first of all exposed. In the example illustrated, the opening provided for the pressure sensor 26 is exposed by removing the pressure sensor 26. However, it is also possible to use any other suitable opening which is or might be present in this area of the housing to carry out the method according to the invention. As soon as the opening 30 in the housing 23 is open, the lance-shaped spray nozzle 14 of the housing 23 is inserted in such a way that the nozzle openings lie opposite the inlet-side end face of the particle filter. To simplify the alignment of the nozzle openings relative to the particle filter during this process, an appropriate marking 31 can be applied to the tube of the spray nozzle 14, as indicated in FIG. 3.

Figure 3:
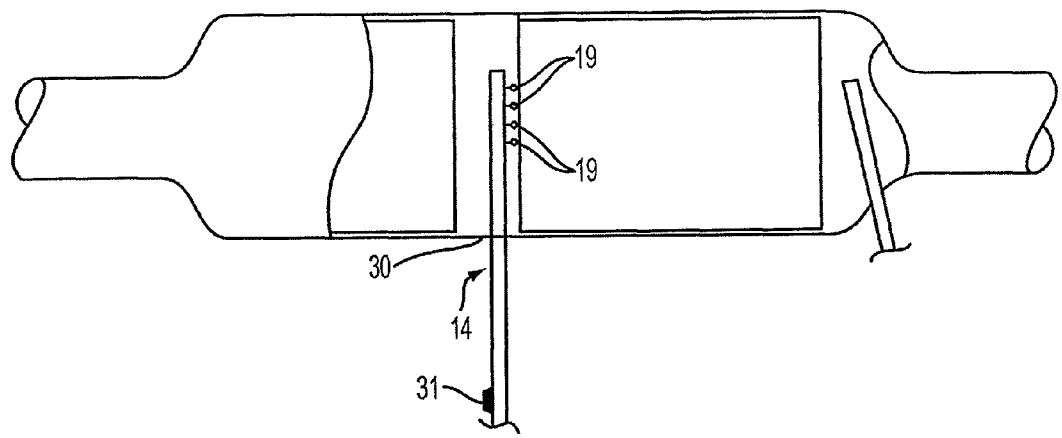
FIG. 3 shows that part of an exhaust gas system which is shown in FIG. 2 during the cleaning of the particle filter in the manner specified by the invention.

If the space before the particle filter cannot be accessed simply by removing sensors or the like owing to the design of the exhaust gas system, it is also possible to remove a corresponding sensor projecting into the space situated after the particle filter 25 as seen in the direction of flow in order then to insert the spray nozzle 14 there, as illustrated in FIG. 3.

After the insertion of the spray nozzle, the outlet valve 11 of the container 10 is opened by actuating the lever 16, allowing the cleaning fluid to be injected into the particle filter at a pressure of from 5 to 12 bar, in particular from 6 to 8 bar, from the inlet side. During this process, the front end of the spray nozzle is moved in such a way that, as far as possible, the entire inlet end face of the particle filter 20 is sprayed with cleaning fluid in order to ensure that all of the interior of the particle filter is substantially completely soaked.

In carrying out the method according to the invention, the cleaning fluid can be injected into the particle filter 25 in such a way that the entire quantity of cleaning fluid to be injected, which preferably corresponds to half the volume of the particle filter 25, is injected continuously in succession.

However, it is also conceivable to carry out the injection of the cleaning fluid into the particle filter 25 in two, three or four passes, waiting times being observed between the individual injection operations, the duration of these waiting times being in a range of from 1 to 10 minutes, preferably of from 3 to 7 minutes, in particular 5 minutes. This makes it possible to ensure that it is easier for the cleaning fluid to penetrate more deeply into the particle filter 25, this being advantageous particularly in the case of particle filters 25 which are very severely clogged.

It is furthermore possible, if both the space before and the space after the particle filter 25 are accessible, to inject one part of the cleaning fluid into the particle filter 25 from the inlet side of the latter and another part from the outlet side thereof. If the cleaning fluid is injected in more than two injection operations, the waiting time can be shortened by injecting the cleaning fluid alternately, first from the outlet side and then from the inlet side. This makes it possible to further improve the complete soaking of the interior of the particle filter.

As soon as the entire amount of cleaning fluid provided for the cleaning operation has been injected, the housing can either be closed again by inserting the corresponding sensors, and the cleaning fluid is thus forced out of the particle filter during the subsequent operation of the combustion engine in the service garage, or, in accordance with the invention, a flushing operation is carried out, in which an ash-free, noncombustible flushing fluid is sprayed into the particle filter, preferably from the inlet side, in order in this way to remove at least some of the cleaning fluid and hence any soot particles contained therein from the particle filter, even before the combustion engine is put into operation. In this process, it is expedient if the flushing fluid is injected at the same pressure as that employed for the injection of the cleaning fluid, but in a reduced quantity.

After the particle filter has been cleaned, it is expedient to carry out active regeneration of the particle filter in order to remove any soot particles which may have remained in the particle filter after cleaning as well.

The method according to the invention can be carried out in a simple manner in any motor vehicle service garage without complex removal and adaptation work on the exhaust or exhaust gas system of a vehicle. Since it is possible in this way to significantly increase the life of the exhaust system, this offers considerable time and cost advantages for the vehicle operator.

The invention claimed is:

1. A method for cleaning particle filters in exhaust gas systems of combustion engines, comprising:
   exposing an opening leading into an interior of a housing, the opening positioned upstream of the particle filter to be cleaned,
   inserting a spray nozzle into the interior of the housing, through the opening, so that nozzle openings of the spray nozzle oppose an upstream end face of the particle filter through which exhaust gas flows during operation of the combustion engine; and
   spraying a noncombustible, ash-free cleaning fluid into the particle filter by the spray nozzle at a pressure of from 5 to 12 bar, across an area of said filter through which the exhaust gas flows during the operation of the combustion engine, such that the cleaning fluid flows from the upstream end face of the particle filter to a downstream end face thereof, in a quantity corresponding approximately to half the volume of the particle filter such that the interior of the particle filter is soaked.

2. The method for cleaning particle filters in exhaust gas systems of combustion engines, as claimed in claim 1, wherein the cleaning fluid is injected successively in two, three or more portions.

3. The method for cleaning particle filters in exhaust gas systems of combustion engines, as claimed in claim 2, wherein the time between the individual injection operations is from 1 to 10 minutes.

4. The method for cleaning particle filters in exhaust gas systems of combustion engines, as claimed in claim 1, wherein the cleaning fluid is injected into the particle filter when the latter is at a temperature of from 10° C. to 100° C.

5. The method for cleaning particle filters in exhaust gas systems of combustion engines, as claimed in claim 1, wherein an ash-free, noncombustible flushing fluid is sprayed into the particle filter after the injection of the cleaning fluid.

6. The method for cleaning particle filters in exhaust gas systems of combustion engines, as claimed in claim 5, wherein the flushing fluid is injected at the same pressure as the cleaning fluid.

7. The method for cleaning particle filters in exhaust gas systems of combustion engines, as claimed in claim 5, wherein the flushing fluid is injected after a waiting time following the ending of injection of the cleaning fluid which is equal to or longer than the time between the individual injection operations for cleaning fluid.

8. The method for cleaning particle filters in exhaust gas systems of combustion engines, as claimed in claim 1, wherein the cleaning fluid is an aqueous alkaline fluid.

9. The method for cleaning particle filters in exhaust gas systems of combustion engines, as claimed in claim 1, wherein the cleaning fluid is injected at a pressure of from 6 to 8 bar.

10. The method for cleaning particle filters in exhaust gas systems of combustion engines, as claimed in claim 3, wherein the time between the individual injection operations is from 3 to 7 minutes.

11. The method for cleaning particle filters in exhaust gas systems of combustion engines, as claimed in claim 3, wherein the time between the individual injection operations is 5 minutes.

12. The method for cleaning particle filters in exhaust gas systems of combustion engines, as claimed in claim 4, wherein the cleaning fluid is injected into the particle filter when the latter is at a temperature of from 40° C. to 70° C.

13. The method for cleaning particle filters in exhaust gas systems of combustion engines, as claimed in claim 1, wherein the combustion engine is a diesel engine in a vehicle.

\* \* \* \* \*